United States Patent [19]

Dickmann et al.

[11] 4,325,855
[45] Apr. 20, 1982

[54] ADHESIVES

[75] Inventors: Heinz H. Dickmann, Bühl; Dieter Hechenberger, Sinsheim-Eschelbach; Richard Krattner, Bühl-Neusatz, all of Fed. Rep. of Germany

[73] Assignee: Lingner and Fischer GmbH, Fed. Rep. of Germany

[21] Appl. No.: 688,959

[22] Filed: May 24, 1976

[30] Foreign Application Priority Data

Sep. 10, 1975 [GB] United Kingdom ............ 37212/75

[51] Int. Cl.³ .................. C08L 1/28; C08L 29/04; C08L 29/12; C08L 33/24
[52] U.S. Cl. ................... 524/219; 106/186; 106/194; 106/213
[58] Field of Search .............. 260/29.6 R, 29.6 E, 260/518 R, 29.6 BE, 29.51 N, 29.6 N, 29.6 H, 29.6 MN, 29.6 B, 29.6 WQ, 29.6 ME; 106/186, 194, 210, 213

[56] References Cited

U.S. PATENT DOCUMENTS 2,820,012  1/1958  Hotten ........................ 260/518 R

OTHER PUBLICATIONS

Cagle, "Handbook of Adhesive Bonding", McGraw-Hill Book Company, 1973, pp. 3-7.
Dreher et al., *N.L.G.I. Spokesman*, 20, No. 11, Feb. 1957, pp. 10-15.
Hotten, *Ind. and Eng. Chemistry*, 49, No. 10, Oct. 1957, pp. 1691-1694.
Skeist, "Handbook of Adhesives", Van Nostrand Reinhold, N.Y., 1962, p. 440.

*Primary Examiner*—Allan Lieberman
*Attorney, Agent, or Firm*—Jacobs & Jacobs

[57] ABSTRACT

Adhesive compositions containing an adhesive polymer, a dispersant for the polymer and a gelling agent which is a salt of a compound of the formula:

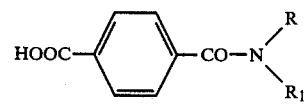

wherein R is hydrogen or alkyl of 1 to 18 carbon atoms and $R_1$ is a hydrocarbon group of 1 to 18 carbon atoms.

6 Claims, No Drawings

ADHESIVES

This invention relates to adhesive compositions which contain gelling agents. More particularly the invention relates to self supporting adhesive compositions and to gelled liquid adhesives, the latter having little or no tendency to run or "tail". In the compositions of this invention, the gelling agent is a salt of a monoamide or terephthalic acid.

Adhesive compositions are in widespread industrial, domestic and office use. By their very nature, they can be unpleasant and difficult to handle when used unskillfully. Consequently manufacturers of adhesives, especially for domestic or office use, have tried to formulate their compositions so as to make them as convenient as possible to handle and use, and to minimise the risk of accidental spillage on or contact with surfaces other than the work surface.

In the home or office, by far the most widely used type of adhesive composition has been a solution or dispersion of an adhesive polymer in a volatile liquid vehicle. Unfortunately, because such compositions are liquid, they are also the most difficult to control in use. They tend to run when applied to inclined surfaces; they have a tendency to form strands or "tails" when the applicator (usually a squeezable tube or a bottle with a flexible dispensing nozzle) is withdrawn from the work surface; they tend to run out of such applicators when left uncapped or otherwise carelessly on the workbench.

Since the majority of the above difficulties arise because the compositions is a flowable liquid, attempts have been made to overcome them by thickening or gelling the liquid to the point where it is no longer spontaneously flowable. However, the adhesive properties of a polymer depend quite critically on intimate contact between the two surfaces to be joined and the intermediate polymer film. Any extraneous materials present in the film tend to have an anti-adhesive effect. Hence the proposed addition of a gelling agent to the uncomplicated basic system of polymer plus volatile solvent is always approached with caution, and with careful evaluation of the effect of the proposed gelling agent on the adhesion characteristics of the composition. Very many of the gelling agents used in areas of technology outside the adhesives area are unsuitable, for example because they intrinsically are incompatible with the adhesive polymer, or because they must be used in too high a concentration and thus destroy adhesion, or because they adversely affect drying-out time, or because they do not gel the solvent system in question.

In spite of these fundamental problems over the choice of a suitable gellant, formulations have been proposed which are in the form of an adhesive stick or crayon which is rubbed onto the work surface, and leave behind an effective adhesive film.

These proposed adhesive sticks are either dispersions of the adhesive polymer in a waxy solid base or gelled solutions or dispersions of the adhesive in a normally liquid vehicle. The latter cases have normally required at least 10% and more usually at least 15% of the gellant to achieve the desired stick consistency. In addition, the previously proposed gellants, particularly fatty acid salts have a small but noticeable anti-adhesive effect.

This invention is based on the discovery that certain derivatives of terephthalic acid can be used in relatively small quantities to gel solutions or dispersions of adhesive polymers without a marked anti-adhesive effect.

Accordingly, the present invention provides an adhesive composition comprising at least one adhesive polymer, at least one non-toxic volatile solvent or liquid dispersant for the adhesive polymer and a gelling agent for the solvent or dispersion medium in an amount sufficient to reduce the tendency of the solution or dispersion to flow under the influence of gravity, characterised in that the gelling agent is a salt of a compound of formula (I):

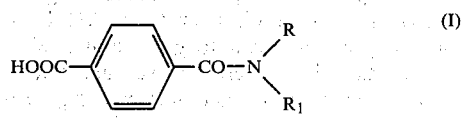

wherein R is hydrogen or a $C_{1-18}$ alkyl group and $R_1$ is a $C_{1-18}$ hydrocarbon group.

Preferably R is hydrogen and $R_1$ is a $C_{4-16}$ alkyl group.

Suitable salts of the compounds of formula (I) include alkali metal, alkaline earth metal, ammonium and substituted ammonium salts. Particularly suitable salts include the sodium, potassium and ammonium salts, the sodium salt being preferred.

Compounds of formula (I) are described and their gellant properties referred to in Industrial and Engineering Chemistry, Vol. 49, No. 10, October 1957, 1691–1694 and in N.L.G.I. Spokesman, 20, No. 11, February 1957, 10–15. There is nothing in these publications which suggests the use of these compounds in adhesives compositions.

In the compositions of the invention the adhesive polymer may be selected from those conventionally used in the preparation of adhesive sticks and liquid adhesives. Suitable adhesive polymers include polyvinyl acetate, polyvinylalcohol, polyvinyl chloride, polyvinylpyrrolidone, polyurethane, polyacrylic acid or polymethacrylic acid or esters thereof, polyacrylamides, methyl cellulose, ethoxylated starch derivatives and the like.

The liquid base present in the compositions of the invention will depend to some extent on the identity of the adhesive polymer to be used, and to some extent on whether the composition is to be in the form of a solid gelled stick or a gelled but flowable liquid. In most cases the liquid base will be a blend of solvents chosen to give the required drying rate and the required solubility or dispersive characteristics. Water will normally be a major component of a stick composition, and mixtures of water and lower alcohol such as methanol, ethanol and glycerine are sometimes useful liquid bases for sticks. For a more flowable composition the liquid base will normally be a mixture of solvents of intermediate polarity. Solvents which have been used in stick and liquid adhesives in the past include water, lower alcohols, low molecular weight esters and ketones. Mixtures of two or more of the following have been used: water, glycerine, methanol, ethanol, isopropanol ethylene glycol, methylacetate, ethylacetate, butyl acetate, dibutylphthalate, cyclohexanone, acetone, methylethylketone and methylisobutylketone. The choice of solvent will also depend on the gelling agent employed. Long chain compounds of formula (I) ($R_1$ and/or $R > 10$ carbon atoms) tend to be relatively insoluble in water and non-aqueous solvent systems may be necessary if highly rigid sticks are desired. Short chain compounds ($R_1$ and/or $R<3$) are very soluble in water and may therefore be uneconomic in aqueous solvent systems.

Small amounts of emulsifiers or dispersing agents may be necessary in certain cases to achieve a homogeneous mix.

Normally the compositions of the invention will contain 5% to 50% by weight of the adhesive polymer, usually from 10% to 40% and very often from 15% to 30%.

The concentration of the gelling agent will be chosen according to the required degree of gelling. Smaller amounts, for example from 0.1 to 2% by weight, will normally be sufficient to gel a liquid adhesive to the point where its tendency to run and "tail" is substantially eliminated. Larger amounts, e.g. from 2.5% to 10%, but sometimes as much as 10 to 25%, may be used in the preparation of adhesive sticks.

We have found that the inclusion of an ionic compound in the compositions of the invention which contain large amounts of water is beneficial in that it enhances the stability of the composition. Although the mechanism is not fully understood, it is believed that the ionic compound produces a certain "salting out" effect which increases the gelling temperature.

Suitable ionic compounds for inclusion in such compositions include NaCl, KCl, $NH_4Cl$, $Na_2SO_4$ and other suitable, water-soluble ionic salts.

We have preferred to include sodium chloride in are self-supporting adhesive compositions.

Normally such ionic compounds are present by from 2% to 15% of the final composition, more usually from 5% to 10% and preferably at about 7% to 8% by weight of the composition.

The self-supporting adhesive compositions of this invention may be prepared by blending the ingredients and heating (generally to 60°–90° C.) either during or after blending. If desired or if more convenient the free acid of formula (I) above may be converted in situ into the desired salt to act as gelling agent by the addition of a base, such as sodium, potassium or ammonium hydroxide during blending. When a homogeneous melt has been prepared it may then be left to cool. During cooling it is best to avoid any substantial agitation of the mixture. Sticks may be made by cooling the mix in moulds.

Alternatively, if as is desirable, an ionic compound is to be included in the composition this may be stirred into the mix already formed by blending and heating the other components of the composition. Frequently the addition of this ionic compound alters the gelling point of the composition and so helps bring about solidification.

Once formed adhesive sticks may be included in a conventional adhesive applicator such as a screw-up lipstick-type dispenser. Alternatively the homogeneous melt may be poured into such an applicator which can thus also serve as the mould in which the melt solidifies. For other adhesive compositions the heated mix may be filled into collapsible tubes and allowed to cool in situ.

The following Examples illustrate the invention:

EXAMPLE 1

An adhesive of the following composition:

| | |
|---|---|
| Polyvinylpyrrolidone (Mol. Wt. 100000) | 20% |
| Glycerine | 10% |
| Sodium-N-Hexylterephthalic acid amide | 5% |
| NaCl | 7.5% |
| Water | 57.5% | was prepared blending together the warmed components. The mix was poured into moulds and on cooling self-supporting sticks were obtained.

EXAMPLE 2

An adhesive of the following composition:

| | |
|---|---|
| Polyvinylacetate | 30% |
| Ethanol | 24% |
| Water | 0.6% |
| Methanol | 9.9% |
| Methylacetate | 35.25% |
| Sodium N-(n-octyl)-Terephthalamide | 0.25% |
| | 100.00% | was prepared by blending the warmed components. The mix was filled into collapsible aluminium tubes, and allowed to cool. An extrudable jelly like composition was obtained which was an effective adhesive with little tendency to run and "tail".

EXAMPLE 3

An adhesive was prepared according to the following formula:

| | |
|---|---|
| n-octyl-terephthalic acid amide | 7% |
| Water | 52% |
| Glycerine | 10% |
| Sodium hydroxide (30%) | 6% |
| Polyvinylpyrrolidone | 25% |

The above ingredients were warmed to a temperature of about 80° C., the mixture being blended during warming. The free acid is not very soluble in water but gradually reaction with the sodium hydroxide converts the acid to the soluble sodium and a homogeneous mix is obtained. The mix was poured into moulds and on cooling, self-supporting adhesive sticks were obtained.

EXAMPLE 4

| | |
|---|---|
| n-octyl-terephthalic acid amide | 3.5% |
| n-hexyl-terephthalic acid amide | 3.5% |
| Glycerine | 15% |
| Polyvinylpyrrolidone | 25% |
| Sodium hydroxide (30%) | 4.5% |
| Water | 48.5% |

The procedure was as in Example 3.

EXAMPLE 5

| | |
|---|---|
| n-octyl-terephthalic acid amide | 5% |
| Sodium hydroxide (30%) | 5% |
| 1,2 propylene glycol | 7% |
| Glycerine | 10% |
| Polyvinyl alcohol- partially saponified | 25% |
| Water | 48% |

The procedure was as in Example 3.

EXAMPLE 6

| | |
|---|---|
| n-decyl-terephthalic acid amide | 3% |
| 1,2 propylene glycol | 17% |
| Polyvinylpyrrolidone | 25% |
| Sodium hydroxide (30%) | 5% |
| Water | 50% |

The procedure was as in Example 3.

What we claim is:

1. An adhesive composition according to claim 1 which consists essentially of polyvinylpyrrolidone in the amount of 20% by weight, glycerine in the amount of 10% by weight, sodium-N-hexylterephthalic acid amide in the amount of 5% by weight, sodium chloride in the amount of 7.5% by weight and water in the amount of 57.5% by weight.

2. An adhesive composition according to claim 1 which consists essentially of polyvinylacetate in the amount of 30% by weight, ethanol in the amount of 24% by weight, water in the amount of 0.6% by weight, methanol in the amount of 9.9% by weight, methylacetate in the amount of 35.25% by weight and sodium-N-(n-octyl)-terephthalamide in the amount of 0.25% by weight.

3. An adhesive composition according to claim 1 which consists essentially of polyvinylpyrrolidone in the amount of 25% by weight, glycerine in the amount of 10% by weight, n-octyl-terephthalic acid amide in the amount of 7% by weight, sodium hydroxide in the amount of 6% by weight and water in the amount of 52% by weight.

4. An adhesive composition according to claim 1 which consists essentially of polyvinylpyrrolidone in the amount of 25% by weight, glycerine in the amount of 15% by weight, n-octyl-terephthalic acid amide in the amount of 3.5% by weight, n-hexyl-terephthalic acid amide in the amount of 3.5% by weight, sodium hydroxide in the amount of 4.5% by weight and water in the amount of 48.5% by weight.

5. An adhesive composition according to claim 1 which consists essentially of polyvinyl alcohol in the amount of 25% by weight, glycerine in the amount of 10% by weight, 1,2-propylene glycol in the amount of 7% by weight, n-octyl-terephthalic acid amide in the amount of 5% by weight, sodium hydroxide in the amount of 5% by weight and water in the amount of 48% by weight.

6. An adhesive composition according to claim 1 which consists essentially of polyvinylpyrrolidone in the amount of 25% by weight, 1,2-propylene glycol in the amount of 17% by weight, n-decyl-terephthalic acid amide in the amount of 3% by weight, sodium hydroxide in the amount of 5% by weight and water in the amount of 50% by weight.

* * * * *

UNITED STATES PATENT AND TRADEMARK OFFICE
CERTIFICATE OF CORRECTION

PATENT NO. : 4,325,855
DATED : April 20, 1982
INVENTOR(S) : HEINZ H. DICKMANN, ET AL.

It is certified that error appears in the above-identified patent and that said Letters Patent are hereby corrected as shown below:

Claims 1-6, line 1 of each claim, delete "according to claim 1".

Signed and Sealed this

Fifteenth Day of October 1985

[SEAL]

Attest:

Attesting Officer

DONALD J. QUIGG

Commissioner of Patents and Trademarks—Designate